(12) United States Patent
Thode et al.

(10) Patent No.: US 10,830,363 B2
(45) Date of Patent: Nov. 10, 2020

(54) ELECTROMAGNETIC VALVE DEVICE, USE THEREOF, AND SYSTEM

(71) Applicant: ETO Magnetic GmbH, Stockach (DE)

(72) Inventors: Oliver Thode, Stockach (DE); Viktor Raff, Konstance (DE)

(73) Assignee: ETO Magnetic GmbH, Stockach (DE)

( * ) Notice: Subject to any disclaimer, the term of this patent is extended or adjusted under 35 U.S.C. 154(b) by 225 days.

(21) Appl. No.: 16/070,358

(22) PCT Filed: Nov. 23, 2016

(86) PCT No.: PCT/EP2016/078512
§ 371 (c)(1),
(2) Date: Jul. 16, 2018

(87) PCT Pub. No.: WO2017/121523
PCT Pub. Date: Jul. 20, 2017

(65) Prior Publication Data
US 2019/0032799 A1 Jan. 31, 2019

(30) Foreign Application Priority Data

Jan. 14, 2016 (DE) .................... 20 2016 100 164 U

(51) Int. Cl.
*F16K 11/04* (2006.01)
*F16K 11/048* (2006.01)
(Continued)

(52) U.S. Cl.
CPC ........ *F16K 11/048* (2013.01); *F16K 27/0263* (2013.01); *F16K 27/0281* (2013.01);
(Continued)

(58) Field of Classification Search
CPC ............... F16K 11/048; F16K 27/0263; F16K 27/0281; F16K 31/423; F16K 1/44; F16K 1/443; F15B 2013/006
See application file for complete search history.

(56) References Cited

U.S. PATENT DOCUMENTS 3,347,259 A 10/1967 Lansky et al.
5,975,134 A * 11/1999 Schwelm .............. F15B 13/086
137/596.15
2007/0209722 A1 9/2007 Overkauff et al.

FOREIGN PATENT DOCUMENTS

CN 1396374 A 2/2003
CN 200958629 Y 10/2007
(Continued)

OTHER PUBLICATIONS

International search report for patent application No. PCT/EP2016/078512 dated Feb. 8, 2017.

*Primary Examiner* — Kelsey E Cary
(74) *Attorney, Agent, or Firm* — Bachman and LaPointe PC; George Coury

(57) ABSTRACT

An electromagnetic valve device having a fluid inlet port (1), which is formed in a valve casing (10), for a fluid to be switched, in particular pneumatic fluid, a working port (2), which is realized in the valve casing, for the fluid and locking component(s) (14), which are moveably guided in the valve casing along an axial direction and which are realized for interacting with a valve seat (26) formed in the valve casing and opening a fluid flow path between the fluid inlet port and the working port and which are moveably realized via fluid switched by means of electromagnetic positioning means (32).

12 Claims, 3 Drawing Sheets

(51) Int. Cl.
   *F16K 31/42*   (2006.01)
   *F16K 27/02*   (2006.01)
   *F15B 13/00*   (2006.01)
   *F16K 1/44*    (2006.01)

(52) U.S. Cl.
   CPC ...... *F16K 31/423* (2013.01); *F15B 2013/006* (2013.01); *F16K 1/44* (2013.01)

(56) References Cited

FOREIGN PATENT DOCUMENTS

| | | | |
|---|---|---|---|
| CN | 102769204 | A | 10/2012 |
| CN | 102917929 | A | 2/2013 |
| CN | 103161975 | A | 6/2013 |
| CN | 103842700 | A | 6/2014 |
| DE | 102006011578 | B3 | 10/2007 |
| DE | 102008031024 | A1 | 12/2009 |
| FR | 2660726 | A1 | 10/1991 |

\* cited by examiner

ELECTROMAGNETIC VALVE DEVICE, USE THEREOF, AND SYSTEM

BACKGROUND OF THE INVENTION

The invention relates to an electromagnetic valve device according to the preamble of the independent claim. Furthermore, the invention at hand relates to a usage of such an electromagnetic valve device, and the invention at hand relates to a system comprising at least two of the generic electromagnetic valve devices.

From the state of the art, generic valve devices in the form of so-called pilot-controlled electromagnetic valves are generally known. In this embodiment of an electromagnetic valve also known as "booster technology", an armature, which is movable in an otherwise known manner in electromagnetic positioning means in response to stationary spool means being energized, interacts indirectly with a valve seat for opening or closing a fluid flow path; a fluid flow then would generally be released or blocked from the fluid inlet port (also referred to as a "pressure port") to the working port by means of the valve seat. Indeed, the electromagnetic positioning means cause the incoming fluid to flow so as to actuate the locking means movably guided in the valve casing in an axial direction by the (pressurized) fluid abutting against a suitable pressure surface of the locking means typically realized as a pestle. A technical advantage of such pilot-controlled valves is that enlarging (nominal) sizes of a fluid diameter to be switched is enabled thereby while a significantly reduced nominal size is required for the pilot control in contrast. In practice and, in this respect, in order to bring the fluid onto the pressure surface, generic electromagnetic positioning means known as such are generally realized as so-called pilot valves. A conceptual example is elucidated in DE 10 2008 031 024 A1.

Not least due to their suitability for various (pneumatic) functions are genus-forming valves typically realized as individual valves, both fluid (air) ports (fluid inlet port as well as working port, often in addition to an aeration valve so that 3/2 way valve is realized) and an electrical port for the electromagnetic positioning means being integrated into or allocated to a valve casing. Such so-called stand-alone valves are used especially in commercial vehicles as pneumatic valves for different switching tasks.

Depending on a respective usage of a generic electromagnetic and pilot-controlled switching valve, embodiments are known and common for this purpose in which the valve is closed when in the home position (i.e. when the stationary winding is not energized and thus when the electromagnetic means are not in an actuated state) as well as being open for the fluid when in such a home position. In practice, these functions are attained in the scope of the generic pilot-controlled or booster technology by the energy storage means (commonly a pressure spring) abutting against the locking means (pestle) and, depending on a respective constructional embodiment, by causing a return position (and thus an unenergized position) to a valve opening position or a valve sealing position in this manner. A valve embodiment closed in the home position is thus also referred to as NC (=normally closed); a valve open in the home position being referred to as NO (=normally opened).

However, the constructional realization of a generic valve differs depending on an NO or NC embodiment, in particular in regard to a concrete embodiment of the valve casing in conjunction with the locking means driven in a movable manner therewithin (which are pilot-controlled in the manner described above). In regard to a flexibility in production and usage, an additional expenditure occurs, for at least two different constructional variations (also in regard to the components) must be made available in order to be able to react according to each situation (alternatively, respective ports must be rearranged, which would lead to different casings in NC/NO valves which are chainable or to only one NC valve or NO valve being able to be chained). This problem becomes more acute by the circumstance that—depending on the presetting of the motor vehicle producer—standardized fastening and mounting conditions typically prevailing at an assembly site, which purport as well as necessitate a required outer design of the valve device and this, moreover, in an environment normally with a lack of space. As a result, the necessity multiplies for a valve producer having a flexible demand spectrum to hold available suitable valve components for a desired requirement, including a casing geometry designed for NC and NO valves.

SUMMARY OF THE INVENTION

The object of the invention at hand is therefore to improve a generic valve device in regard of its flexibility in manufacturability and in particular in its suitability for being flexibly adjustable to different conditions in regard of a valve behavior when not energized, in particular creating an electromagnetic valve device for this purpose which is simplified in design as well as being designed as an NO and NC valve in a simple manner.

This object is attained by the electromagnetic valve device having the features of the independent claim.

Advantageous further embodiments of the invention are described in the dependent claims. According to the invention, a usage of such an electromagnetic valve device as a pneumatic valve is claimed, and in the scope of the invention at hand a system having at least two of the electromagnetic valve devices according to the invention is claimed, each of these valve devices comprising fluid inlet ports, which are connected to each other so as to conduct fluid, said connection being realized by a transverse bore allocated to each valve casing, extending transversally to the axial direction and being installed for being coupled to each adjacent valve device.

According to the invention, a compact multi-arrangement of valves can be additionally and advantageously realized, which can be realized having a simple design as well as being able to be switched easily and efficiently.

In an advantageous manner according to the invention, the invention at hand initially uses the possibility of realizing the valve seat in two parts and (axially) bilaterally according to the invention so that the locking means can alternatively close and open this first opening area or the opposite second opening area, respectively, via its axial movement in the valve house. Generally, the locking means each comprise polymer sealing surfaces, which are each suitably inserted and/or aligned with the first or second opening area, for this purpose in order to cause this effect.

The symmetry along the axial direction principally thus attainable enables in the manner according to the invention to use the valve casing (received in the valve outer casing) in (at least) two relative or receiving positions, an NC valve function (the return force, which is caused for example by a return spring suitably abutting against the locking means, closes the fluid flow path when the pilot valve is not energized) as well as an NO function (the fluid flow path between the working port and the fluid inlet port is opened when the pilot valve is not activated) being able to be realized in particular through this, depending on the receiving position. This occurs in the scope of the invention only by the receiving position according to the invention being changed, a preferred realization of the invention intending the valve casing (suitably realized like a module for this purpose and therefore realized so as to be inserted or integrated) to be tilted in a plane extending perpendicular to the axial direction.

In practical consequence, this leads to the NO valve devices as well as the NC valve devices being able to be realized in an outer casing in conjunction with a shared component group, namely the valve casing according to the invention, by means of a mere changed insertion or re-insertion of the valve casing relative to the valve outer casing.

Supply lines, in particular for the fluid inlet port and for the working port, also remain as unchanged as the preferred electromagnetic positioning means, which can be advantageously realized as a separate component group, for realizing the pilot valve.

According to a further embodiment of the invention, the module-like valve casing comprises a cylindrical outer contour at least in sections, which is realized for suitably interacting with an inner wall of the valve outer casing realized equally hollow cylindrical in sections. In this manner, the module idea according to the invention can be realized so as to be easily mounted.

In a manner particularly favorable according to the invention, a re-insertion or rearrangement of the valve casing relative to the valve outer casing between the first and the second receiving position is enabled via a sealing behavior between the outer jacket surface of the valve casing and the opposite inner surface of the valve outer casing; in particular, the working port is to be separated from the fluid inlet port in terms of pressure. In a manner advantageous to the further embodiment of the invention, this occurs by sealing means being provided in or on the outer jacket surface of the valve casing and being realized in the form of a sealing ring extending inclined across the outer jacket surface in the scope of a preferred embodiment; said sealing ring, held in a suitably provided groove, effects the necessary seal in a constructively simple and inexpensive manner regarding mounting. Supplementary or alternatively, sealing sections can be provided on the valve casing on the jacket side (more preferably be integrated on or in the jacket surface, for example under a multi-component injection molding process when realizing the valve casing from a hard plastic material and when realizing the sealing means from rubber-elastic polymer material), other more complex sealing processes also being possible through this and correspondingly optimized manufacturing conditions being specified.

In particular the advantageous plastic injection molding technology according to the further embodiment also enables the compact module-like valve casing to be produced in large numbers and inexpensively and to simultaneously ensure the required fluid flow progresses in the valve casing by realizing suitable channels in this plastic body—for example in regard to the complex function of the valve seat having a first and an opposing second opening area. An advantageous effect is not only the re-insertion according to the invention and thus the variability in the manufacturing between NO and NC functions, but also the minimization of the assembly space required in the axial direction in all variations, all the way to the advantageous effect of a best possible introduction surface (maximized front surface) for the pilot-controlled fluid pressure being able to be introduced within an available width of the valve casing or the valve outer casing and in the face of (standardized) fastening bores or similar fixing means generally provided on the outer casing.

Moreover, a particularly preferred realization of the invention is when the valve casing provides an additional aeration port beyond the fluid inlet port and the working port, said additional aeration port in particular being realized or switched such that the working port is connected to the aeration port for fluid when the valve is in a locked condition (and thus when the fluid flow from the fluid inlet port is disrupted).

Thus, the invention at hand is most suitable for different applications as a pneumatic valve for (commercial) vehicles, however, the invention at hand is neither restricted to this area of use nor is pneumatic fluid the only possible variation in the scope of the invention. Ultimately, an embodiment of the invention in the scope of the system according to the invention enables the valve device to be connected to each other as a multi-valve arrangement, leaving a usage of valve devices according to the invention as individual valves behind (the mentioned mounting bores provided in the outer casing being mechanically connected so as to suitably align for the purpose of the multi-valve arrangement). In addition, the invention advantageously intends to allocate a through bore (generally extending transversely to the axial direction and open towards the fluid inlet port) to each individual valve, said through bore also enabling connecting the valves on the inlet side, respectively, according to fluid in relation to an arrangement of adjacent valves according to the invention. It is then only necessary to provide a first valve of this arrangement with a fluid supply on the inlet side, the further valves would then accordingly be connected according to pressure and merely the last valve of this arrangement would then comprise a seal or a locking of this through channel on its end side.

As a result, the invention thus enables to significantly reduce the complexity when producing several variations of generic pilot-controlled electromagnetic valves in a constructional surprisingly simple and elegant manner, with in particular significant axial (and radial) assembly space advantages or space usage advantages being able to be realized beyond the required necessity of specific component groups in particular for NO and NC technologies.

BRIEF DESCRIPTION OF THE DRAWINGS

Further advantages, features and details of the invention can be derived from the following description of preferred exemplary embodiments as well as by means of the drawings.

In the following.

Figure 3:
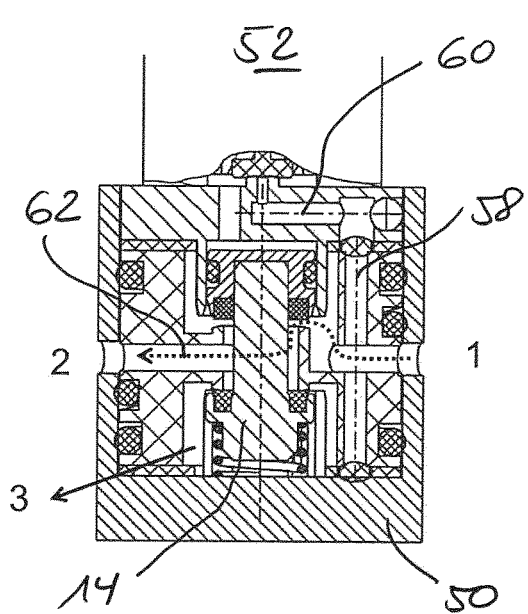
FIGS. 3 and 4 having partial FIGS. 3(a), (b), FIGS. 4(a), (b), illustrate sectional views of an electromagnetic valve device according to the first embodiment of the invention in a mounting form as a (NO) 3/2 way valve open in the home position; the views in FIG. 3 illustrating the position (home position) when not energized and the views in FIG. 4 illustrating the position when pilot-controlled or when energized and controlled in the switching position.
Figure 3:
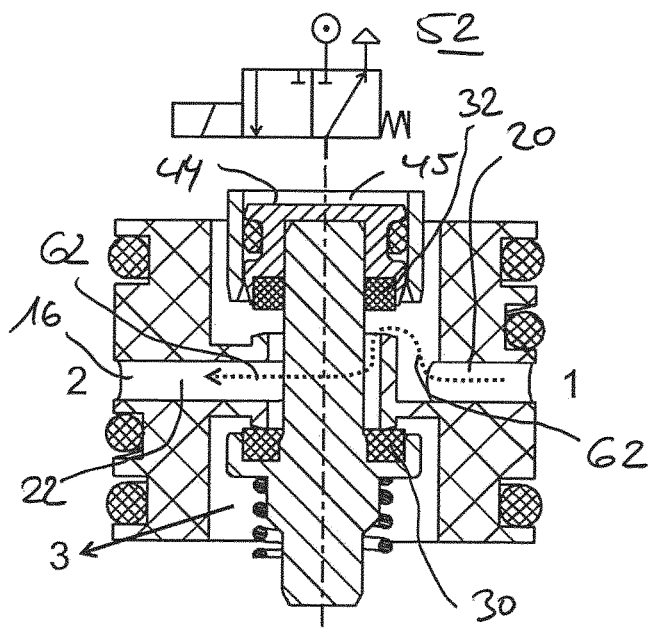
Figure 4:
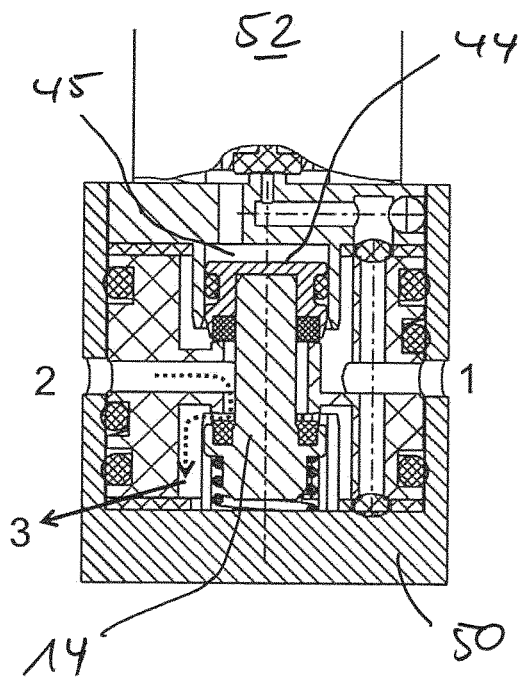
Figure 4:
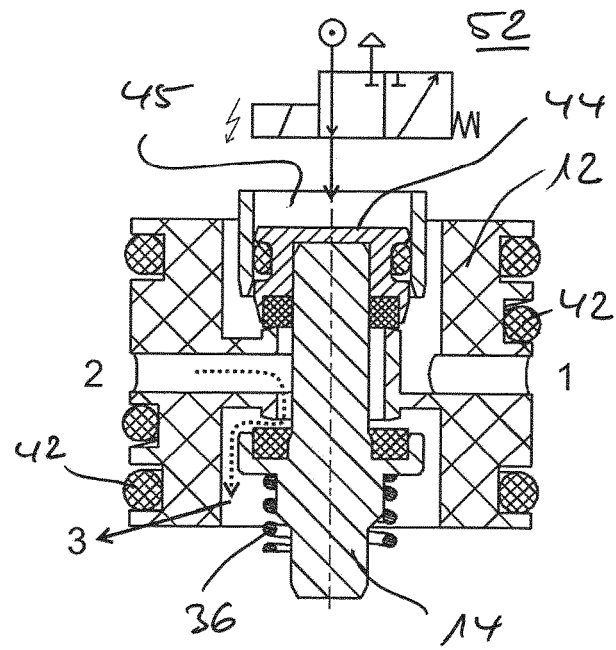
Figure 5:
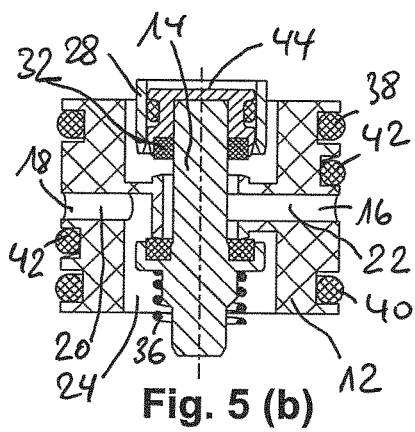
Figure 5:
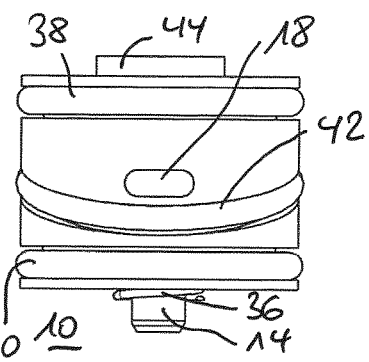
Figure 5:
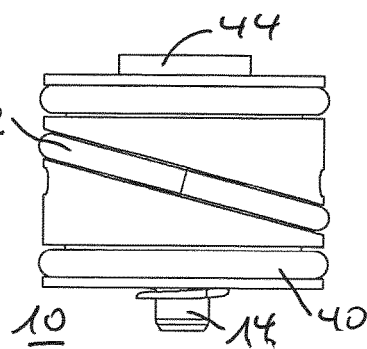
Figure 5:
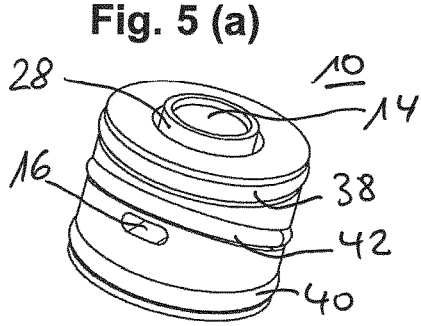
Figure 6:
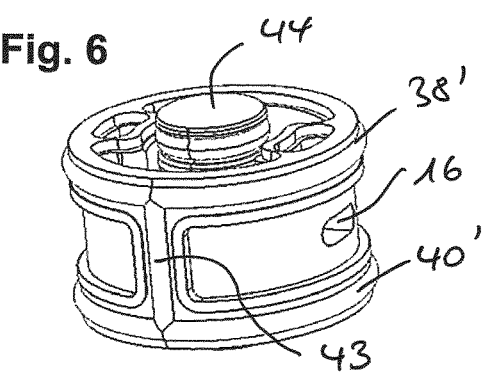
Figure 7:
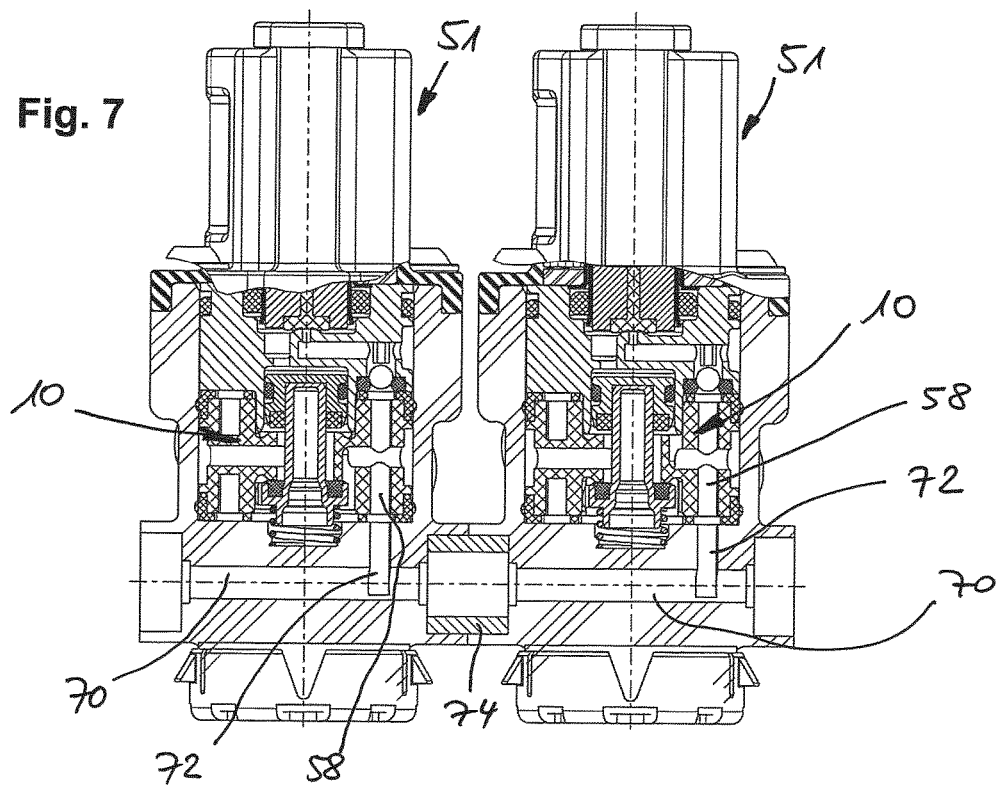

FIG. 5 having partial FIGS. 5(a) to (d), illustrates different views of the module-like valve casing, which is realized so that it can be rotated or re-inserted, for realizing the valve device of the first exemplary embodiment of FIGS. 1 to 4;

FIG. 6 illustrates a perspective view of an alternative embodiment of a valve casing, in particular via a varied embodiment of seals, which are realized on the jacket, to the valve casing of FIG. 5; and FIG. 7 illustrates, according to another exemplary embodiment of the invention at hand, a schematic longitudinal section view through two electromagnetic valve devices coupled with each other so as to form a system, additionally illustrating a possible outer casing design or contact infrastructure.

FIGS. 5(a) to 5(d) illustrate in different views the design of the module-like valve casing according to a first exemplary embodiment of the invention. In this context, FIG. 5(a) illustrates a perspective view, FIG. 5(b) illustrates a longitudinal cut, and FIGS. 5(c) and 5(d) illustrate lateral views, which are rotated by 90° with respect to each other, on the outer jacket of the cylindrical valve casing.

DETAILED DESCRIPTION

More explicitly, this valve casing 10 is essentially made of a plastic body 12, which is made of a hard plastic material via an injection molding process and on the one hand provides a guide for an axial pestic stem unit 14 movably axially mounted in the interior and on the other hand comprises a channel and fluid guiding infrastructure, which, on a jacket side, forms a first opening 16 and a second opening 18, which is formed on an opposite side of the jacket side, each opening 16 and 18 having connecting fluid guiding channels 20, 22 initially extending radially. These open into a central opening 24 on the bottom side in the instance of channel 22, and in the form of middle slots or rather valve-seat-like outlets 26 parallel to the axis in the instance of channel 22, said outlets 26 being open in both axial directions and surrounding the pestic stem unit 14 or rather extending around the jacket.

As in particular the longitudinal section views in FIG. 5(b) illustrates in this regard, a stem or pestle 14 (which may be referred to herein as a stem or pestle interchangeably), which is guided in a sleeve-like guide 28 (and is generally made of a plastic material), carries a pair of annular seals 30, 32 made of a polymer material, said seals 30, 32, which are directed towards each other, being fastened on the elongated pestle 14 so as to close the outlet 26 either via the seal 32, depending on a displacement movement of the pestle 14 in the casing 12, or via the seal 30 (the lower one in the illustration) on the opposite side. In the scope of the invention, these possible sealing or closing positions describe a first or second location, respectively, of the pestle 14 (as a locking or stem means) within the valve casing.

Additionally, the sectional view of FIG. 5(b) in turn illustrates particularly well how a pressure spring 36, which is supported at a support bearing, pretensions the pestle 14 in the sealing position by abutting against a section of the pestle 14, the (lower) seal 30 closing the channel outlet 26 in the sealing position.

In particular a comparison of the different external views of the valve casing in FIGS. 5(a), (c) and (d) further illustrate how an annular seal 38, 40, which each axially extend at both ends in a radial plane and are held in an annular groove in the casing 12, is realized on the casing while an additional seal 42, which extends inclined with respect to the axial direction (which extends vertically in the figure plane in FIG. 5(b), for example, and is symbolized by the dashed line) ensures that, with respect to the outer jacket of the casing 12, the first casing opening 16 is sealed or rather decoupled according to fluid from the opening 18 arranged on the opposite side of the jacket.

The valve casing designed in the manner illustrated in FIG. 5 is received in a valve outer casing in a manner described below, where, depending on the type of reception or montage, either a valve (NC) closed when in the home position or alternatively an open (NO) valve when in the home position is realized. The pestle 14 which is movable in the valve casing 12 is actuated via a fluid abutting against an abutment or pilot surface 44 (on the top in the figure plane of FIG. 5(b)).

More explicitly, this pilot control occurs via an application of fluid, which can occur via an electromagnetically actuated pilot-control valve 52 (FIGS. 1 to 4) allocated to or switched upstream of this surface 44 in an otherwise known manner.

The pilot-control function is also described by means of FIGS. 1 to 4 in conjunction with the description of the modes of operation under usage of the valve casing of the valve device constructed in FIG. 5 in the following.

Figure 1:
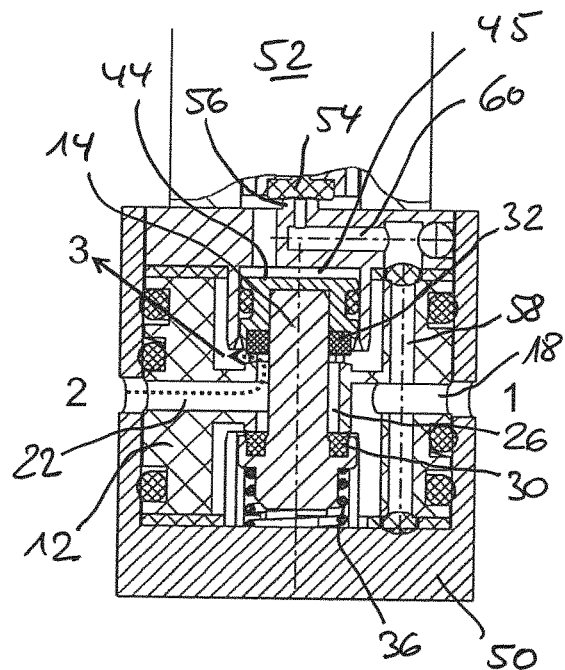
FIGS. 1 and 2 having partial FIGS. 1(a), (b), FIGS. 2(a), (b), illustrate sectional views of an electromagnetic valve device according to a first embodiment of the invention in a mounting form as a (NC) 3/2 way valve closed in the home position; the views in FIG. 1 illustrating the position when not energized (home position) and the views in FIG. 2 illustrating the position when pilot-controlled or controlled when energized in the switching position.
Figure 1:
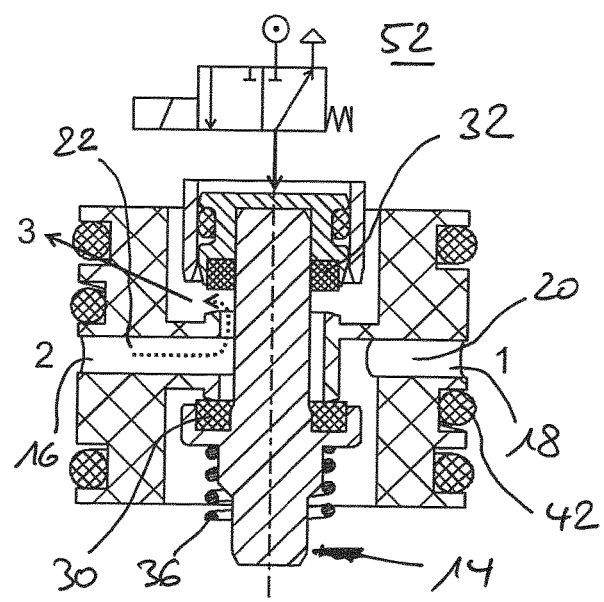
Figure 2:
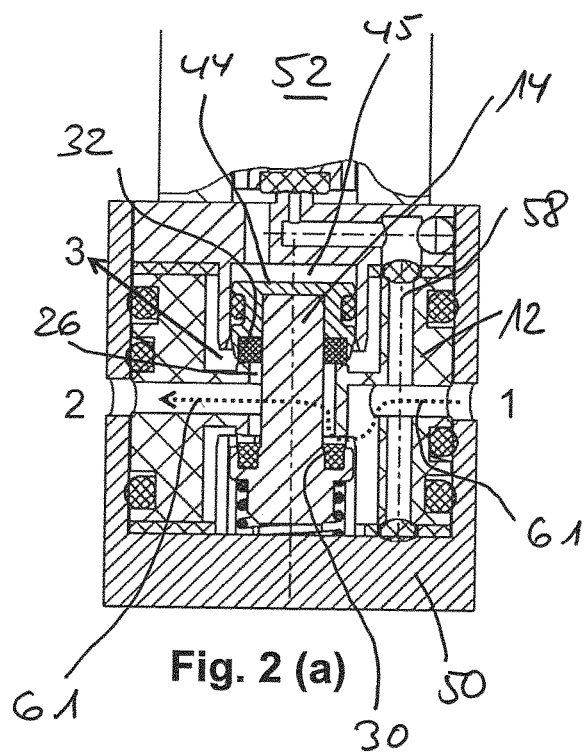
Figure 2:
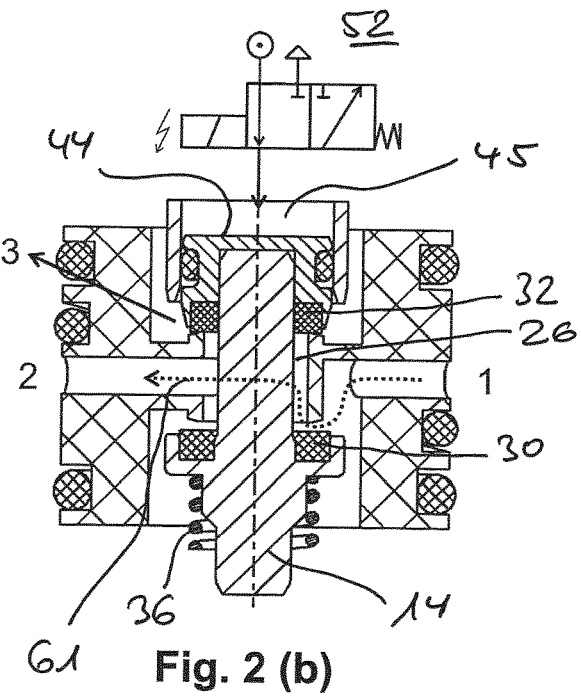

In this instance, FIGS. 1 and 2 (each having partial views) illustrate the usage of the valve casing in the scope of a pilot-controlled 3/2 way valve mounted such that the relative receiving position of the valve casing 12 realizes the configuration of a (NC) valve closed in a home position in a surrounding outer casing 50. More explicitly, the partial images (a) of FIGS. 1 and 2 each illustrate the NC mounting state while the partial images (b), insofar building on the principal sectional view in FIG. 5(b), illustrate the fluid flow as well as the pilot-controlled movement condition in detail.

Illustrated only schematically in the view, a pilot control valve 52, which is realized as an electromagnetic valve in an otherwise known manner, sits on the outer casing 50 or an upper area of the same, an anchor unit, which moves a seal 54 in relation to an upper valve seat 56, causing an application of fluid on the front side (front section) 44 of the pestle 14 in reaction to stationary means (not illustrated) being energized in the pilot-control valve 52. For the purpose of supplying fluid to the pilot valve, the sectional views (a) from FIGS. 1 and 2 illustrate additional guiding channels 58 (parallel to the axis) or 60 (radial), with the insulated and enlarged longitudinal sectional views (b) not illustrating this longitudinal channel, which is parallel to the axis, in order to simplify the illustration.

FIG. 1 first illustrates how a fluid flow in the home position is possible in the mounting configuration as a 3/2 way valve closed in the home position. In this context, reference numeral 1 (as in all other views in the scope of the exemplary embodiments at hand) refers to a pressure port or fluid inlet port for incoming air in the scope of the embodiment as a pneumatic valve. Reference numeral 2 illustrates the working port open or closed with respect to 1, and reference numeral 3 illustrates another port on the exit side in the make of an aeration port, said port being open or closed to the working port depending on the switching position. Due to the NC configuration, that is closed in the home position and consequently the pilot-control valve is deactivated (whose armature is in the resting position, the respective spool not being energized), the pressure spring 46 presses the lower seal 30 against the channel opening 26 from below. This causes fluid at the inlet port 1 to abut against the valve seat 56 via the channels 58, 60, however, owing to the closed pilot valve no further control can take place. Furthermore, the current relative position of the pestle 14 locks a fluid flow 1 to the casing body 12 towards the working port 2, as illustrated in the sectional view of FIGS. 1(a) and (b), so that the valve is actually closed in this position, according to the unenergized home position.

In the left-hand side of FIGS. 1(a) and (b), in contrast, it becomes clear how a fluid communication is enabled between the working port 2 and the aeration outlet 3 via the relative opening position of the upper seal 32 at the pestle with respect to the channel outlet 26 of the casing body.

The view of the valve's switching diagram in the upper area of partial FIG. 1(b) illustrates accordingly the unenergized operation state of the pilot valve 52.

With respect to FIG. 1, FIG. 2 clarifies the pilot-controlled activated switching condition of the NC 3/2 way valve at an identical insertion or receiving position, respectively, of the valve casing 12 in the outer casing 50:

Fluid abutting against the valve seat 56 via the channels 58, 60 is opened via the opened or distanced valve rubber 54 towards the front surface 44 of the pestle unit 14. A comparison of the longitudinal sectional view illustrates insofar in this regard how a fluid reception space 45 is enlarged in front of this front surface 44, elucidated insofar that the pestle 14 was axially guided downwards in the figure plane (and corresponding to its axial movement direction) via the fluid pressure, against the compressing return force of the pressure spring 36. This leads to the switching condition of FIGS. 2(a) and (b), respectively—in this instance, the upper valve (annular) ring 32 rests in a sealing manner on the middle part of the casing body 12 forming the channel outlet 26 and provides an upper seal while the seal 30 releases the channel 26 at the end axially opposite. As illustrated by the dashed line 61, this leads to the fluid connection being released between the fluid inlet port (realized in this instance via the casing inlet 18 including the channel 20) and the working port 2, realized in this mounting position via the casing connection 16 including the channel 22 arranged upstream. In contrast, the connection between the working port 2 and the aeration port 3 is locked by the effect of the upper seal 32.

In relation to the operational state of FIG. 2, namely pilot-controlled and thus opened positions of the 3/2 way valve, the switching symbol from FIG. 2(b) illustrates for the pilot-control valve the energized state and thus the active effect in the pilot control.

In the mounting state of FIGS. 3 and 4 (each having analogous partial figures (a) and (b)), the mounting components are identical in relation to FIGS. 1 and 2, however, the inner casing 12 surrounded or received by the valve outer casing 50 is inclined in FIGS. 3 and 4 (inclined by 180° with respect to a horizontal plane).

In this context, this inclination relates to the actual casing body, provided with reference numeral 12; the mounting direction of the pestle 14, which is set in or on the body 12 and includes the sealing pair 30, 32, in turn is realized such that the control surface (front surface) 44 is connected to the pilot valve towards the upper free end of the outer casing while at the bottom, the pretension pressure spring 36 is supported at an internal casing bottom of the outer casing 50.

A comparison of the partial figures of FIG. 3 to FIG. 1 (and simultaneously FIG. 4 to FIG. 2) makes clear that this reversed insertion of the valve casing relative to the outer casing is realized from the NC configuration in FIG. 1 and a NO configuration in FIG. 2, i.e. an open function without energy, in FIGS. 3 and 4. The fluid flow illustrated by the dashed line 62 in FIGS. 3(a) and (b) between the inlet connection 1 and the working port 2 illustrates this open configuration without energy. A fluid pressure is actually available at the valve seat 56 of the pilot valve 52 via the channels 58, 60 (the radially extending channel 60 in turn being realized in a lid structure, however, it is not realized in the internal valve casing 10 itself). Since this pilot control valve 52, however, is not energized in this operational state illustrated in FIG. 3, this seat 56 is not opened via the seal 54 so that the pestle 14 remains in its position found in the upper area in FIGS. 3(a) and (b) and pretensioned upward by the spring.

Since the upper pestle seal 32 thus opens the inlet 1 to the channel 26, the fluid illustrated by the dotted line 62 can flow to the working port 2 as an outlet in a manner open without energy. In contrast, as illustrated in the partial figures of FIG. 3, the lower pestle seal 30 closes a connection between the working port 2 and the aeration port 3.

Analogous to the NC configuration of FIGS. 1 and 2, in turn, FIG. 4 having the partial figures (a) and (b) illustrates the pilot-controlled state in contrast to FIG. 3, i.e. the operation when the pilot valve 52 is activated. The correspondingly open valve seat 56 in FIG. 4(a) enables incoming fluid in the pressure space 45 so that the pestle 14 can be pressurized (in an axial downward direction in the figure plane) against the return force of the bottom-side pressure spring 36 via its front surface 44 on the pressure side. This valve actuation leads to the inward channel outlet 26 being closed via the upper seal ring 32 (which prohibits fluid communication 1-2 while the opening, which was caused by the downward moving and switching state, of the downward facing outlet 26 via the seal 30 in turn permits a fluid connection between the working port 2 and the aeration port 3).

From the view above, it becomes clear that both valve topologies can thus be produced by merely an individual configuration of the valve casing, more explicitly the body 12 preferably made of a plastic material as an injection mold part, and depending on its relative position in the surrounding casing (outer casing) 50.

As a modification of the casing unit 10 provided by means of a seal 42 extending inclined and arranged on the jacket, FIG. 6 illustrates a possible variation. In this instance, a comparable sealing behavior is realized via vertically extending sealing sections 43 besides the functionally unchanged and radially extending seals 38' and 40', said sealing sections 43 sealing the respective casing openings 16, 18 from each other with respect to the fluid in equal measure.

The sealing behavior from FIG. 6 is merely an example, with other variations and modifications also being conceivable in this instance. The view in FIG. 6 is suitable for a realization preferred in relation to a production in large numbers in a particular manner, in which the polymer sections 38', 40' and 43' are not available as discrete rings to be mounted later but to be put together automatically using a multi-material injection molding process.

FIG. 7 illustrates a possible insertion context of the invention at hand in the manner of a valve system made of two of the valve devices according to the invention. The valve inner casing 10 is arranged within an outer casing 50' (illustrated less schematically) in each instance, and an upper area 51 of a respective valve outer casing provides a reception for the pilot valve 52 to be provided therein in each instance, including an allocated stationary spool, stationary magnet core and an also not illustrated electrical plug contact.

The views in FIG. 7 illustrate in a particularly favorable manner how the electromagnetic valve devices, which are initially well suited as individual valves, can be mechanically switched to a multi-valve arrangement in a favorable manner from a flow viewpoint, namely by channels 70, which extend in the bottom-side area of the respective outer casing 50' transverse to the axial direction (the vertical direction in the figure plane accordingly in turn in FIG. 7) being provided which communicate with the vertical channels 58 of the fluid inlet port via fluid channel sections 72 parallel to the axis.

This leads to a fluid pressure, which abuts against the inlet port 1, being transferred via the channel arrangements 58-72-70 to each adjacent valve in regard of the rear side (entry side) so that these do not have to be supplied separately with fluid pressure on the entry side. For this purpose, FIG. 7 schematically illustrates the possibility of connecting expanded ends of the transverse channels 70 to suitable connection or pressure seals 74. At a cross section (not illustrated), the sequence of the individual channels 70 would in turn be closed on the end side.

The invention claimed is:

1. An electromagnetic valve having a fluid inlet port (1), which is formed in a valve casing (10), for fluid to be switched, a working port (2), which is formed in the valve casing, for the fluid, and stem means (14) movably guided in the valve casing along an axial direction for interacting with a valve seat (26) formed in the valve casing and opening a fluid flow path between the fluid inlet port and the working port, wherein the stem means is movable via a fluid switched by electromagnetic positioning means (32), an axially directed drive force of the fluid counteracting a return force acting on the stem means via spring means (36), wherein the valve seat (26) is formed axially bilaterally such that a first opening area is exposed in a first axial displacement position of the stem means relative to the valve casing and a second opening area, which is arranged opposite to the first opening area, is exposed in an opposing second axial displacement position, and the valve casing is modular and received in a valve outer casing (50) having external ports, which align with the fluid inlet port as well as the working port, such that when the electromagnetic positioning means are not activated, the return force closes the fluid flow path in the valve outer casing at least partially surrounding the valve casing when in a first receiving position of the valve casing (NC, FIG. 1), and when the electromagnetic positioning means are not activated, the return force keeping the fluid flow path open in a second receiving position of the valve casing in the valve outer casing (NO, FIG. 3), in contrast to the first receiving position, the second receiving position being a changed mounting and relative position of the valve casing in the valve outer casing.

2. The device according to claim 1, wherein the valve casing (10) comprises an outer contour, which is cylindrical at least in sections for fittingly interacting with the valve outer casing (50) which has the shape of a hollow cylinder at least in sections.

3. The device according to claim 1, further comprising sealing means (42; 43) comprising a sealing ring extending inclined, and positioned in or on an outer jacket surface of the valve casing in such a manner that the sealing means seal the fluid inlet port and the working port from each other, in relation to an inner surface of the valve outer casing, when in the first and the second receiving position.

4. The device according to claim 3, wherein the sealing means (43) comprises polymer and/or rubber-elastic components and is fastened on or in the valve casing in a fixed manner.

5. The device according to claim 4, wherein the sealing means (43) comprise polymer and/or rubber-elastic components and are fastened on or in the valve casing in a fixed manner as a result of a multi-component injection molding process.

6. The device according to claim 1, wherein the electromagnetic positioning means is a pilot command valve (52), and wherein the electromagnetic positioning means override a fluid pressure which acts on the end of an axial front section of the stem.

7. The device according to claim 1, wherein ducts (20, 22), which extend radially at least in sections and define a section of the fluid flow path to the valve seat, connect to the fluid inlet port and/or the working port in the valve casing which comprises a plastic injection molded part.

8. The device according to claim 1, wherein a fluid flow path is defined in ducts of the valve casing such that the working port (2) is open to the first and the second opening area.

9. The device according to claim 1, wherein the valve casing comprises a component group formed integrally from a plastic material and forming the fluid inlet port, the working port, the first and the second opening area as well as connection ducts.

10. The device according to claim 1, wherein the valve casing comprises an aeration port (3) as an additional valve port which can be connected to the fluid inlet port or the working port by the additional valve port being switched by being displaced.

11. A system having a plurality of the electromagnetic valve devices according to claim 1, wherein respective fluid inlet ports (1) of the plurality of the electromagnetic valve devices are connected to each other so as to conduct fluid, the connection being via a transverse bore (70) allocated to each valve casing, extending transversally to the axial direction and installed for being coupled to each adjacent valve device.

12. The device according to claim 1, wherein the valve casing is rotated 180 degrees along the axial direction.

\* \* \* \* \*